E. KNOTT.
INNER TUBE TESTER.
APPLICATION FILED JULY 21, 1921.
1,416,649.
Patented May 16, 1922.
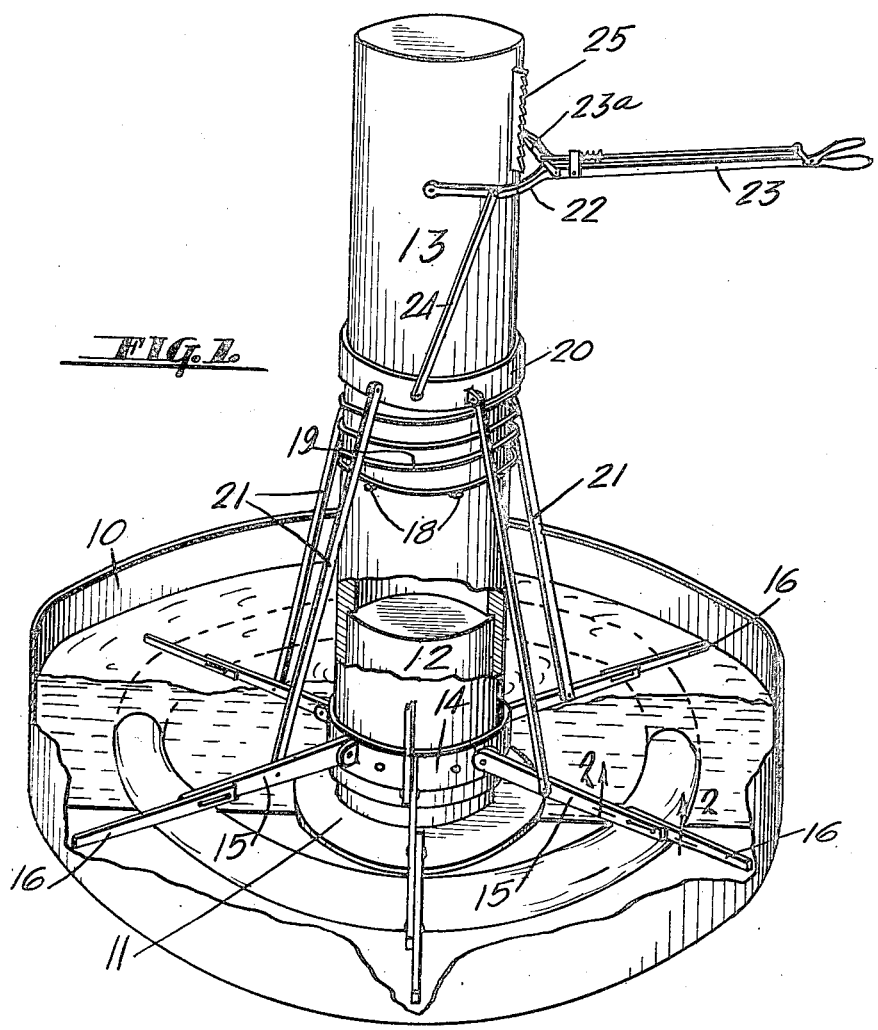
FIG. 1.
FIG. 2.
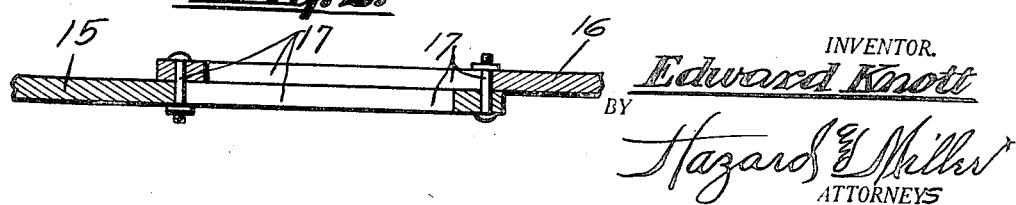
INVENTOR.
Edward Knott
BY
Hazard & Miller
ATTORNEYS

UNITED STATES PATENT OFFICE.

EDWARD KNOTT, OF LOS ANGELES, CALIFORNIA.

INNER-TUBE TESTER.

1,416,649.                        Specification of Letters Patent.         Patented May 16, 1922.

Application filed July 21, 1921. Serial No. 486,391.

*To all whom it may concern:*

Be it known that I, EDWARD KNOTT, a citizen of the United States, residing at Los Angeles, in the county of Los Angeles and State of California, have invented new and useful Improvements in Inner-Tube Testers, of which the following is a specification.

This invention relates generally to testing apparatus, and more particularly to a device for testing the inner tube of pneumatic tires for determining the presence of punctures or air leaks; the principal object of my invention being to provide a relatively simple and practical device that will engage and retain an inflated member, such as a pneumatic tire inner tube or the like, under the surface of a body of water, and which procedure it will be understood, will indicate by air bubbles the presence and location of any air leaks in the submerged inflated member.

Further objects of my invention are to provide a device that may be easily and quickly manipulated in performing the testing operations, to provide a device that will accommodate pneumatic tire inner tubes of different sizes, and further to provide a device that will be very effective in performing its intended functions.

With the foregoing and other objects in view, my invention consists in certain novel features of construction and arrangement of parts that will be hereinafter more fully described and claimed and illustrated in the accompanying drawings, in which:

Figure 1 is a perspective view of a testing device of my improved construction, portions thereof being broken away in order to more clearly illustrate the construction of said device.

Fig. 2 is an enlarged section taken approximately on the line 2—2 of Fig. 1.

Referring by numerals to the accompanying drawings which illustrate a practical embodiment of my invention, 10 designates a shallow tank or container preferably formed of sheet metal, and of such size as to accommodate the larger sizes of pneumatic tire inner tubes when the same are inflated.

Secured in any suitable manner to the center of the bottom of this tank or container is a plate or disc 11 and projecting upwardly therefrom is a post or standard 12. The lower portion of a hollow standard 13 is arranged to rotate freely on the post or standard 12, and secured to the lower portion of said rotatably mounted standard is a ring 14 to which is pivotally connected the inner members 15 of radially arranged extensible arms and which latter include outer members 16 that have pin and slot connections 17 with said inner members 15, so that they may be adjusted lengthwise for a certain distance upon said inner members 15 in order to properly support the larger sizes of inner tubes (see Fig. 2).

Encircling the intermediate portion of hollow standard 13 and supported at its lower end by pins, such as 18 that are seated in said hollow standard, is a compression spring 19, and bearing on the lower end thereof is a ring 20 that is loosely arranged on standard 13. Pivotally connected to ears that project outwardly from this ring 20 are the upper ends of link 21, the lower ends of which are pivotally connected to the intermediate portions of the inner members 15 of the extensible tube supporting arms. Pivotally connected to the rotatably mounted standard 13 and on opposite sides of the upper portion thereof are the ends of a yoke 22 with which is formed integral an outwardly projecting handle 23, and pivotally connected to the arms of said yoke are the upper ends of links, such as 24, the lower ends of which are pivotally connected to ring 20.

Hand lever 23 is provided with a manually operable latch or pawl 23[a], the point of which is adapted to engage the teeth of a vertically disposed ratchet bar 25, and which latter is fixed to the upper portion of standard 13. Under normal conditions, or while the device is not in use, a point of latch or pawl 23[a] is disengaged from the teeth of the ratchet bar 25 and the expansive power of spring 19 retains ring 20 in an elevated position, and as said ring is connected to the extensible tube supporting arms by the links 21, said extensible arms occupy substantially upright positions adjacent to the lower portion of rotatably mounted standard 13.

In performing the testing operations the pneumatic tube is inflated until it is fully distended and in which condition it is placed over the handle 23 and upper portion of the standard 13 and moved downwardly relative thereto past the extensible arms that occupy positions adjacent to the lower portion of said standard 13. After the tube has been thus positioned on the surface of the body of water within the tank or container 10, the outer end of handle 23 is engaged and pulled downwardly thereby moving ring 20 downward against the resistance afforded by spring 19 and through link connections 21, the extensible arms comprising the members 15 and 16 engage on top of the tube and force the same downwardly until said tube is entirely submerged, and if there are any apertures in said tube of sufficient size to permit the leakage of air, the presence and location of such apertures will be developed by air bubbles arising through the body of water from said apertures.

After the hand lever has been pulled downwardly to force the tube beneath the surface of the water, as just described, the parts are locked in their shifted positions by the engagement of the latch or pawl 23ª in one of the notches of ratchet plate 25.

In order to carefully examine all parts of the submerged tube, the person making the test stationed at a convenient point adjacent to the edge of the tank, may slowly rotate the submerged tube and the standard 13 and associated parts, by successively engaging the extensible arms and moving the same in a horizontal direction until all parts of the tube have been carefully examined.

A testing device of my improved construction possesses superior advantages of simplicity, durability and general efficiency, and provides means for very rapidly testing pneumatic tire tubes and the like for the location of air leaks.

It will be readily understood that minor changes in size, form and construction of the various parts of my improved inner tube tester may be made and substituted for those herein shown and described without departing from the spirit of my invention, the scope of which is set forth in the appended claims.

I claim as my invention:

1. In a testing device for pneumatic tire inner tubes and the like, a tank, a standard projecting upwardly therefrom, means for submerging an inner tube and forcing the same beneath the surface of the body of water contained within the tank including arms arranged for vertical swinging movement on said standard for engaging said tube.

2. In a testing device for pneumatic tire inner tubes, a member adapted to contain water, a standard projecting upwardly from said member, and manually operable means including arms arranged for swinging movement on said standard for engaging a pneumatic tire inner tube and forcing the same beneath the surface of the water within said member.

3. In a testing device for pneumatic tire inner tubes, a tank adapted to contain water, a rotatably mounted standard projecting upwardly from said tank, and means including arms arranged for vertical swinging movement upon said rotatably mounted standard for engaging a pneumatic tire inner tube and retaining the same beneath the surface of the water within the tank.

4. In a testing device for pneumatic tire inner tubes, a tank adapted to contain water, a standard projecting upwardly from said tank, and a series of radially arranged extensible arms pivotally supported upon said standard for engaging and retaining a pneumatic tire inner tube beneath the surface of the water within said tank.

5. In a testing device for pneumatic tire inner tubes, a tank adapted to contain water, a standard projecting upwardly from said tank, a series of radially arranged extensible arms pivotally supported upon said standard for engaging and retaining a pneumatic tire inner tube beneath the surface of the water within said tank, and manually operable means for actuating said pivotally mounted extensible arms.

6. In a pneumatic tire inner tube testing device, a tank adapted to contain water, a standard projecting upwardly from said tank, a series of radially disposed arms pivotally connected to the lower portion of said standard, a spring for normally maintaining said arms in elevated positions, and manually operable means for moving said arms downwardly against the resistance afforded by said spring and for forcing an engaged inner tube beneath the surface of the water in said tank.

In testimony whereof I have signed my name to this specification.

EDWARD KNOTT.